United States Patent [19]

Eklöf

[11] Patent Number: 4,494,614

[45] Date of Patent: Jan. 22, 1985

[54] HYDRAULICALLY OPERATED IMPACT DEVICE

[75] Inventor: Åke T. Eklöf, Skärholmen, Sweden

[73] Assignee: Atlas Copco Aktiebolag, Nacka, Sweden

[21] Appl. No.: 346,238

[22] Filed: Feb. 5, 1982

[30] Foreign Application Priority Data

Feb. 11, 1981 [SE] Sweden ................................ 8100961

[51] Int. Cl.[3] ......................... B23B 45/16; F01B 31/00

[52] U.S. Cl. .................................... 173/116; 173/131; 173/112; 173/139; 92/86; 92/143

[58] Field of Search ............... 173/116, 139, 134, 112; 92/85 B, 86, 143, 8

[56] References Cited

U.S. PATENT DOCUMENTS 2,965,074 12/1960 Williamson ........................... 92/8 X
4,006,666 2/1977 Murray ........................... 92/85 B X
4,068,727 1/1978 Andersson et al. ................. 92/85 B
4,073,350 2/1978 Eklof et al. ......................... 173/139

FOREIGN PATENT DOCUMENTS 1391796 4/1975 United Kingdom ................ 173/116

*Primary Examiner*—E. R. Kazenske
*Assistant Examiner*—W. Fridie
*Attorney, Agent, or Firm*—Frishauf, Holtz, Goodman and Woodward

[57] ABSTRACT

In an hydraulic rock drill there is an hydraulic so called recoil damper that damps the reflected shock waves that propagates from the rock backwardly through the drill stem. The damper comprises a support piston (68) slidably in a cylinder so that a pressure chamber (20) is formed in which the support piston has a piston area. Narrow clearances (75,76) between the support (68) and its cylinder form leak passages and these leak passages are coupled in series with an orifice restrictor (84) to sump. The pressure peaks in the pressure chamber do not reach sealing rings located at the outer portions of the clearances.

13 Claims, 4 Drawing Figures

HYDRAULICALLY OPERATED IMPACT DEVICE

BACKGROUND OF THE INVENTION

This invention relates to an hydraulically operated impact device, e.g. rock drill, comprising a reciprocably driven hammer piston arranged to impact upon an anvil means of a tool member, a supporting member for axially supporting the tool member, and a support piston that is slidable in a cylinder and subject to the hydraulic pressure in a pressure chamber in order to bias said supporting member into a defined forward end position. The pressure chamber is connected to a source of high pressure fluid and narrow clearances between the relatively moving surfaces of the support piston and its cylinder form narrow leak passages from said pressure chamber. The support piston and the pressure chamber form a damping device that reduces the stress on the housing of the impact device by dampening the reflected shock waves that propagate from the bit of the tool rearwardly through the tool which can be the drill stem of the rock drill or the chisel of a jack hammer or the like.

An impact device of this kind is described in U.S. Pat. No. 4,073,350. Because of the tolerances, it is unavoidable that the narrow clearances vary a great deal between rock drills of the same production line. Since the leakage varies with the cube of the width of the clearances, the leakage will vary a great deal. The leakage is a loss of energy which reduces the overall efficiency of the impact device.

One object of the invention is to control the leak flow out of the dampening device and simultaneously to give the damping device long service intervals. This will be achieved by the features defined in the characterizing parts of the claims.

DETAILED DESCRIPTION

Figure 1:
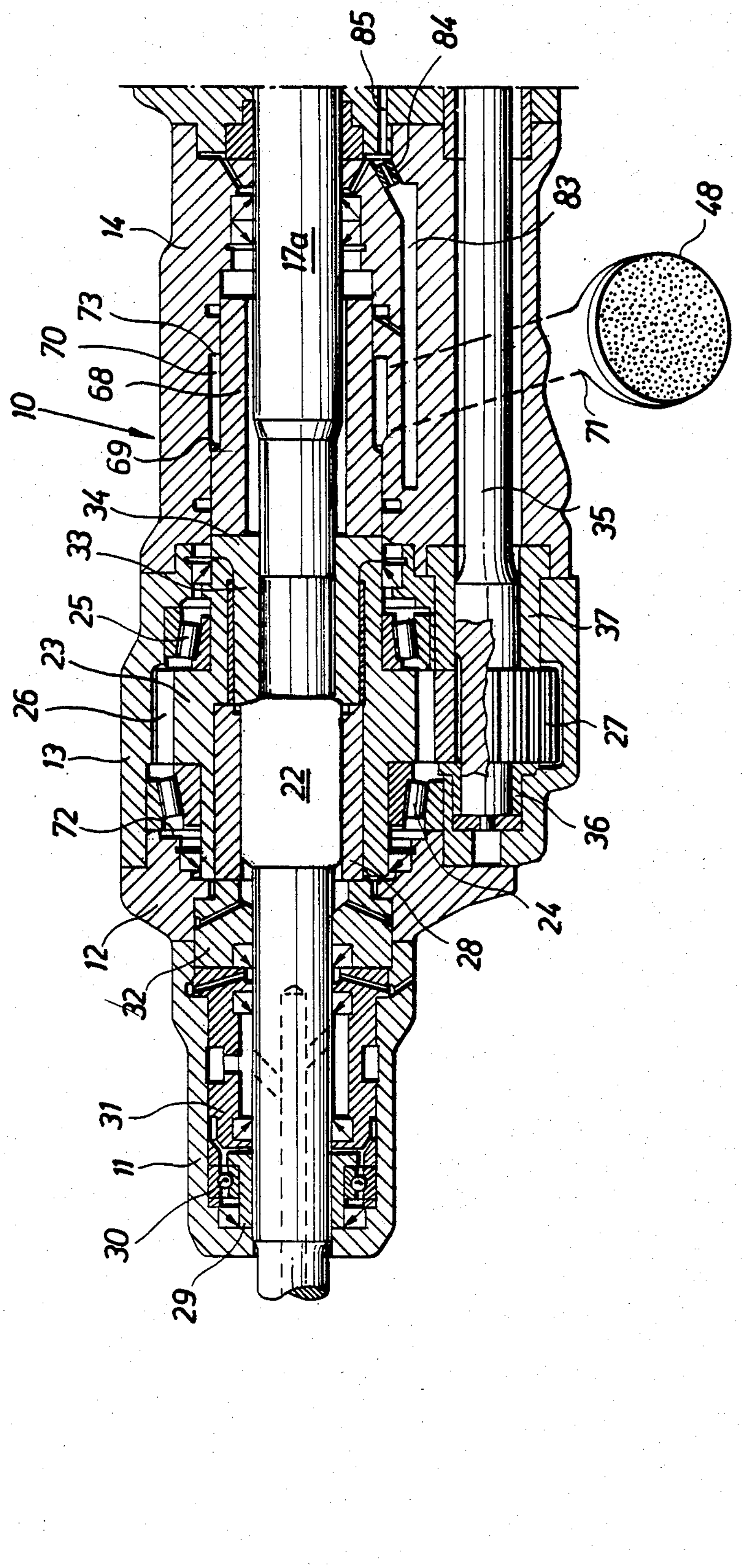
FIG. 1 is a longitudinal section through the front part of a rock drill according to the invention.
Figure 2:
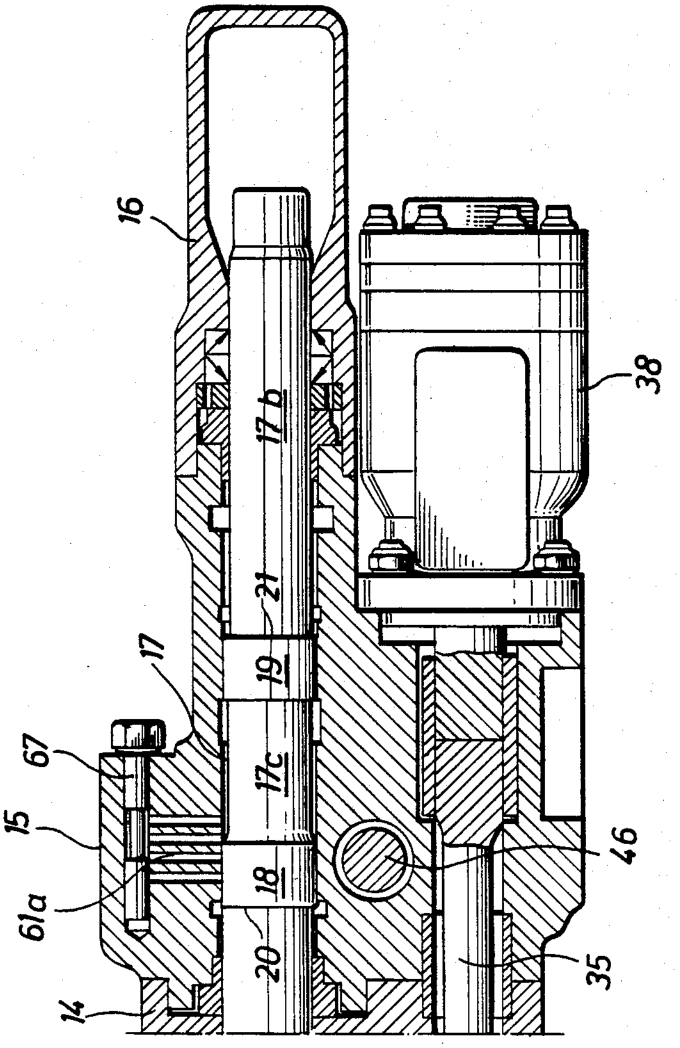
FIG. 2 is a longitudinal section through the rear part of the rock drill.

In the figures, the rock drilling machine 10 comprises a front head 11, a cover 12, a gear housing 13, an intermediate part 14, a cylinder 15 and a back head 16. A hammer piston 17 is reciprocable within the cylinder 15. The hammer piston 17 consists of a cylindrical rod with two piston portions 18, 19 having piston surfaces 20, 21. The portion of the hammer piston which extends forwardly from the piston portion 18 is denoted by 17*a*, and the portion which extends rearwardly from the piston portion 19 is denoted by 17*b*. The rod portion between the rod portions 18, 19 is denoted by 17*c*.

The piston portion 17*a* is arranged to deliver impacts against an adapter 22, which is intended to be connected with a drill string (not shown). A rotation chuck 23 is rotatably journalled in the gear housing 13 by means of roller bearings 24, 25. The rotation chuck 23 is provided with a gear ring 26 which cooperates with a gear wheel 27. A driver 28 transmits the rotation of the rotation chuck 23 to the adapter 22. The inner and outer surface of the driver or chuck bushing are out of round. The adapter 22 is thus non-turnably guided in the driver 28; but is axially movable, however, relative to the driver. The forward end of the adapter 22 is journalled in the front head 11 by means of a guide 29 and a ball bearing 30. Flushing fluid is supplied to the axial hole of the adapter 22 and the drill string through a flushing head 31. A stop ring 32 is mounted between the flushing head 31 and the driver 28. A support bushing 33 is inserted in the rear portion of the rotation chuck 23. The support bushing 33 is provided with a collar 34 adapted to rest against a rear end surface of the rotation chuck 23.

The gear wheel 27 is splined to a shaft 35. The shaft 35 is journalled in bushings 36, 37 in the gear housing 13. The shaft 35 is rotated by means of a hydraulic motor 38 attached to the cylinder 15.

Figure 3:
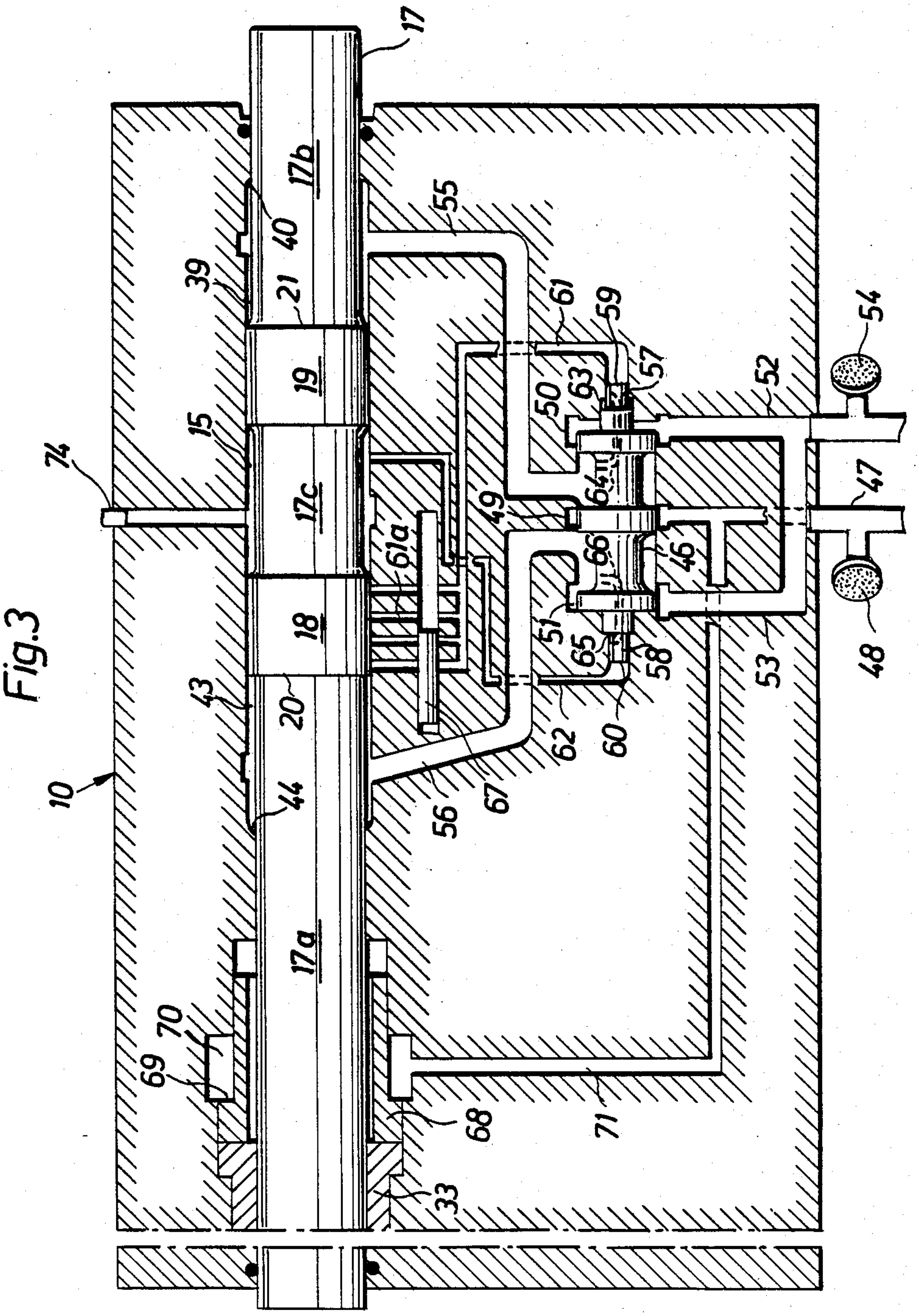
FIG. 3 shows a coupling circuitry of the rock drill shown in FIGS. 1 and 2. Corresponding details have been given the same reference numeral in the various figures.

As seen in FIG. 3, a rear annular pressure chamber 39 is defined by the cylinder 15, the rod portion 17*b*, the piston surface 21 on the piston portion 19, and the front surface of a sealing ridge 40. A forward annular pressure chamber 43 is defined in the same way by the cylinder 15, the rod portion 17*a*, the piston surface 20 on the piston portion 18, and the rear surface of a circular sealing ridge 44.

A distributing valve in the form of a slide 46 is supplied with pressurized hydraulic fluid through a supply conduit 47. An accumulator 48 is continuously connected to the supply conduit 47. On the one hand, the accumulator 48 discharges an instantaneously increasing pressurized hydraulic fluid flow during the working stroke of the hammer piston 17, and on the other it receives a certain amount of hydraulic fluid before the hammer piston has reversed upon the slide shift at the extreme positions. The supply conduit 47 leads to an annular inlet chamber 49 in the cylinder of the distributing valve. The cylinder of the valve has also two annular outlet chambers 50, 51 to which return conduits 52, 53 are connected. These return conduits lead to a non-illustrated sump from which a non-illustrated positive displacement pump sucks hydraulic fluid so as to supply the supply conduit 47 with a constant flow of pressurized hydraulic fluid through a non-illustrated control valve. An accumulator 54 is continuously connected to the return conduits 52, 53. The accumulator 54 shall prevent pressure shocks from arising in the system. The accumulators 48, 54 equalize the highly fluctuating need of pressurized hydraulic fluid of the impactor during the cycle of impacts and also equalize the pressure peaks.

With the slide 46 in its left-hand end position (FIG. 3), pressurized hydraulic fluid is supplied to the rear pressure chamber 39 through a combined supply and drain passage 55 while the forward pressure chamber 43 is drained through the return conduit 53 through another combined supply and drain passage 56. With the slide 46 in its non-illustrated right-hand end position, pressurized hydraulic fluid is instead supplied to the forward pressure chamber 43 through the passage 56 while the rear pressure chamber 39 is drained through the passage 55.

The slide 46 has extending end portions 57, 58, the end surfaces 59, 60 of which are acted upon by the pressure in control passages 61, 62 which terminate in the cylinder wall of the hammer piston 17. The end portion 58 has an annular piston surface 63 which is acted upon by the pressure in the passage 55 through a passage 64 in the slide 46. The end portion 59 has a similar piston surface 65 which is acted upon by the pressure in the passage 56 through a passage 66 in the slide 46. The piston surfaces 63, 65 constitute holding surfaces and are therefore of smaller area than the end surfaces 59, 60 which constitute shifting surfaces. A passage 74 is connected to sump so as to drain the space between the piston portions 18, 19. Thereby, one of the control passages 61, 62 will always drain through this passage 74 when the other one of these control passages is supplied with pressurized hydraulic fluid.

The control passage 61 has four branches which terminate in the cylinder wall of the hammer piston 17. The reference numeral 61*a* denotes one of these branches. One or several of these branches can be blocked by means of an exchangeable regulator plug 67. By this arrangement the rear turning point of the hammer piston 17 and thereby the piston stroke can be varied, which means that a various number of strokes and percussion energy per blow can be obtained.

A retard piston 68 is displaceably and rotatably guided in the intermediate part 14. A piston surface 69 on the retard piston defines a movable limitation wall of a retard or cushioning chamber 70. The retard chamber 70 is limited rearwards by a surface 73 in the machine housing. The retard chamber 70 communicates with the supply conduit 47 and the accumulator 48 through a passage 71. The feeding force applied to the rock drill 10 is transferred to the drill string via the pressurized hydraulic fluid in the retard chamber 70. Preferably, the piston surface 69 on the retard piston 68 and the accumulator 48 are dimensioned so that the force acting forwardly on the retard piston 68 substantially exceeds the feeding force. By such a dimensioning, the position in which the adapter 22 and thus the work tool is situated when the hammer piston hits the adapter remains unchanged independently of variations in the feeding force. This forwardly-acting force is transferred to a surface 72 on the cover 12 via the collar 34 of the rotation chuck bushing 33, the rotation chuck 23 and the thrust bearing 24.

The operation of the rock drill will now be described with reference to the figures.

Assume that the slide 46 is in the position shown in FIG. 3, so that the rear pressure chamber 39 is supplied with pressurized hydraulic fluid and the forward pressure chamber 43 is evacuated. Assume also that the hammer piston 17 is moving forward. The regulator plug 67 blocks the two right branches of the control passage 61. In the position in which the hammer piston 17 is in FIG. 3, the control passage 62 is being drained through the draining passage 74 and the control passage 61 has been drained through the forward pressure chamber 43 until the piston portion 18 covered the branch 61*a*. The slide 46 is positively retained in its position because the pressure in the supply conduit 55 is transmitted to the holding surface 63 of the slide. When the hammer piston 17 moves forward (to the left in FIG. 3), the control passage 61 is again opened so as to drain now into the draining passage 74. Then, when the piston portion 19 passes the port of the control passage 62, it opens the port to the rear pressure chamber 39 from which the pressure is conveyed through the control passage 62 to the end face 60 of the slide. Now, the slide shifts to its non-illustrated second position (to the right in FIG. 3) so that the forward pressure chamber 43 is pressurized while the rear pressure chamber 39 is drained. This takes place just before the hammer piston strikes the adapter 22. The slide 46 is positively retained in its right-hand position because the pressure in the supply conduit 56 is conveyed to the holding surface 65 of the slide. The control passage 62 is already in communication with the drain passage 74 when the piston surface 20 of the piston portion 18 passes the branch passage 61*a* of the control passage 61 so that the pressure in the forward pressure chamber 43 is transmitted through the control passage 61 to the end face 59 of the slide. The slide 46 shifts therefore to its left-hand position shown in FIG. 3 where it remains as previously described because of the fluid pressure upon the holding surface 63. Pressurized hydraulic fluid is now supplied through the inlet 47 to the rear pressure chamber 39 and the hammer piston 17 retards due to the hydraulic fluid pressure upon the piston surface 21. Now, the accumulator 48 receives the hydraulic fluid forced out from the pressure chamber 39 because of the movement to the rear of the hammer piston 17 which decreases the volume in the pressure chamber 39. The accumulator 48 is supplied with pressurized hydraulic fluid also during the first part of the work stroke. However, when the hammer piston 17 reaches the speed that corresponds to this supplied flow, the accumulator 48 starts supplying pressurized hydraulic fluid to the pressure chamber 39 and thus further increases the speed of the hammer piston 17.

When a feeding force is applied to the rock drilling machine 10, the adapter 22 will be biased against the rotation chuck bushing 33. The rotation chuck bushing 33 will be retained in its position shown in FIG. 1 because the forward-acting force on the retard piston 68 exceeds the feeding force. Therefore, when the feeding force is applied, the contact surface 72 will only be unloaded.

When the drill string and the adapter 22 recoils from the rock, during operation of the rock drilling machine, the adapter 22 strikes against the rotation chuck bushing 33. The recoil pulses are transmitted to the retard piston 68 and further to the pressurized hydraulic fluid in the retard chamber 70, and the fluid works as a recoil pulse transmission member. The accumulator 48 or other suitable spring means is constantly connected to the fluid cushion by means of the hydraulic fluid column in the passage 71. If the recoil force exceeds a certain value, the rotation chuck bushing 33 and therefore also the retard piston 68 are lifted out of contact with the rotation chuck 23. By this arrangement the influence of the recoil on the rock drilling machine 10 is damped. The adapter 22 and the drill string are then returned by means of the pressure in the retard chamber 70 to the position which is independent of the feeding force.

The rotation of the rotation chuck 23 and the adapter 22 is transmitted to the retard piston 68 by means of the rotation chuck bushing 33. The pressurized hydraulic fluid in the retard chamber 70 thus provides a thrust bearing for the adapter 22 and the drill string.

Narrow clearances 75, 76 are formed between the relatively moving surfaces (rotation and axial movement) of the support piston 68 and its cylinder that is formed in the intermediate part 14 of the housing. These clearances 75, 76 form narrow leak passages from the pressure chamber 70. In annular grooves 77, 78 at the outer ends of the clearances there are sealing rings 79, 80 (FIG. 4), and passges 81, 82 lead from the inner sides of the grooves 77, 78 to a passage 83 in which there is a replaceable screw 84 with a through bore that forms an orifice restrictor. A passage 85 leads off the leakage oil to the outlet passages 52, 53. Thus, the two clearances 75, 76 form two restrictions that are connected in parallel with each other and connected in series with the orifice restrictor 84. The restrictor 84 is a sharp edge orifice nozzle, that is, a nozzle that has a sharp inlet edge.

It is advantageous to have a small leakage out of the pressure chamber 70 since the leakage oil removes heat from the pressure chamber. The leakage should, however, not be too big since the leakage is a loss of energy. The described combination of the restrictions 75, 76, 84 has two main advantages; it makes the changes in leakage flow relatively small when the viscosity changes and it reduces the impact of the actual width of the clearance upon the leakage flow. If the viscosity is reduced, the flow through the clearances 75, 76 increases, and because of the increased flow which has to pass through the orifice restrictor 84, the pressure drop across the orifice restrictor 84 increases. Thus, the pressure drop across the clearances 75, 76 decreases and the decreased pressure drop tends to reduce the flow through the clearances. As a result, the increase in leakage flow will be comparatively small.

In practice, the actual clearances will vary from rock drill to rock drill because of the tolerances. Because of the orifice restrictor 84, the variations in leakage flow between the drills will be comparatively small also when the clearances will vary a great deal. In a rock drill in which the width of the clearances was 0.015 mm and the orifice 84 had a diameter of 0.5 mm, the leakage flow was 1.2 liters/min. When the width of the clearances was doubled, the leakage flow increased to 1.7 liters/min which is a very small increase.

In the pressure chamber 70, there is the normal pump pressure which is usually above 200 bar, but pressure peaks occur which are several times higher. These peaks will occur even when the passage 71 between the chamber 70 and the accumulator 48 is short, straight and wide as shown in FIG. 1 since the pressure build-up is very rapid. The pressure peaks will, however, dampen out in the clearances so that the sealing rings 79, 80 will not have to stand the excessive peak pressure. The pressure applied to the sealing rings is the pressure in the passage 83, which is lower than the pressure in the pressure chamber 70.

I claim:

1. An hydraulically operated impact device, e.g. a rock drill, comprising:

a reciprocably driven hammer piston (17*a–c*) arranged to impact upon an anvil means of a tool member (22);

a supporting member (33,34) for axially supporting the tool member (22);

means defining a pressure chamber (70);

means for constantly connecting said pressure chamber (70) to a source of high pressure fluid;

a support piston (68) which is slidable in a cylinder means and which is subject to hydraulic pressure in said pressure chamber (70) in order to bias said supporting member (33,34) into a defined forward end position;

narrow clearances (75,76) located between relatively moving surfaces of said support piston (68) and said cylinder means in which said support piston (68) is slidable, said narrow clearances (75,76) forming narrow leak passages from said pressure chamber (70);

sealing rings (79,80) located at the outer end portions of said narrow clearances (75,76) to seal off the ends of said narrow clearances between said support piston (68) and said cylinder means;

passages (81,82) leading from portions of said narrow clearances interior of said sealing rings and communicating with said narrow clearances (75,76); and an orifice restrictor (84) connected to said narrow clearances (75,76) via said passages (81,82), said narrow clearances (75,76) being connected in series with said passages (81,82) and said orifice restrictor (84) to a sump, said orifice restrictor (84) being connected between said narrow clearances (75,76) and said sump.

2. An impact device according to claim 1, wherein said orifice restrictor (84) has a sharp inlet edge.

3. An impact device according to claim 1 or 2, wherein said orifice restrictor (84) is a replaceable unit mounted in a passage downstream of said first mentioned passages (81, 82).

4. An impact device according to claim 1 or 2, wherein the pressure drop ratio between the orifice restrictor (84) and the clearances (75,76) is between 25% and 75%.

5. An impact device according to claim 1 or 2, wherein the pressure drop ratio between the orifice restrictor (84) and the clearances is higher than 50%.

6. An impact device according to claim 3, wherein the pressure drop ratio between the orifice restrictor (84) and the clearances (75,76) is between 25% and 75%.

7. An impact device according to claim 3, wherein the pressure drop ratio between the orifice restrictor (84) and the clearances is higher than 50%.

8. An impact device according to claim 1, wherein said passages (81, 82) lead from the inner sides of said sealing rings and connect said narrow clearances (75, 76) with said orifice restrictor (84).

9. An impact device according to claim 1 or 8, wherein said pressure chamber (70) is between said support piston (68) and said cylinder means; said narrow clearances (75, 76) are located on opposite sides of said pressure chamber (70) in the direction of sliding movement of said support piston (68); and said passages (81, 82) comprise two passages, each passage communicating with a respective one of said narrow clearances (75, 76).

10. An impact device according to claim 9, comprising passage means connecting said passages (81, 82) with said sump, and wherein said orifice restrictor is located in a portion of said passage means.

11. An impact device according to claim 1 or 8, comprising passage means connecting said passages (81, 82) with said sump, and wherein said orifice restrictor is located in a portion of said passage means.

12. An impact device according to claim 11, wherein said orifice restrictor has an orifice having a diameter which is substantially larger than the width of said narrow clearances, and wherein the cross-sectional area of said opening of said orifice is substantially smaller than the cross-sectional area of the channel in which said orifice restrictor is located.

13. An impact device according to claim 1 or 2, wherein said orifice restrictor has an opening having a diameter which is substantially larger than the width of said narrow clearances.

* * * * *

UNITED STATES PATENT AND TRADEMARK OFFICE
CERTIFICATE OF CORRECTION

PATENT NO. : 4,494,614

DATED : January 22, 1985

INVENTOR(S) : Åke T. EKLOF

Figure 4:
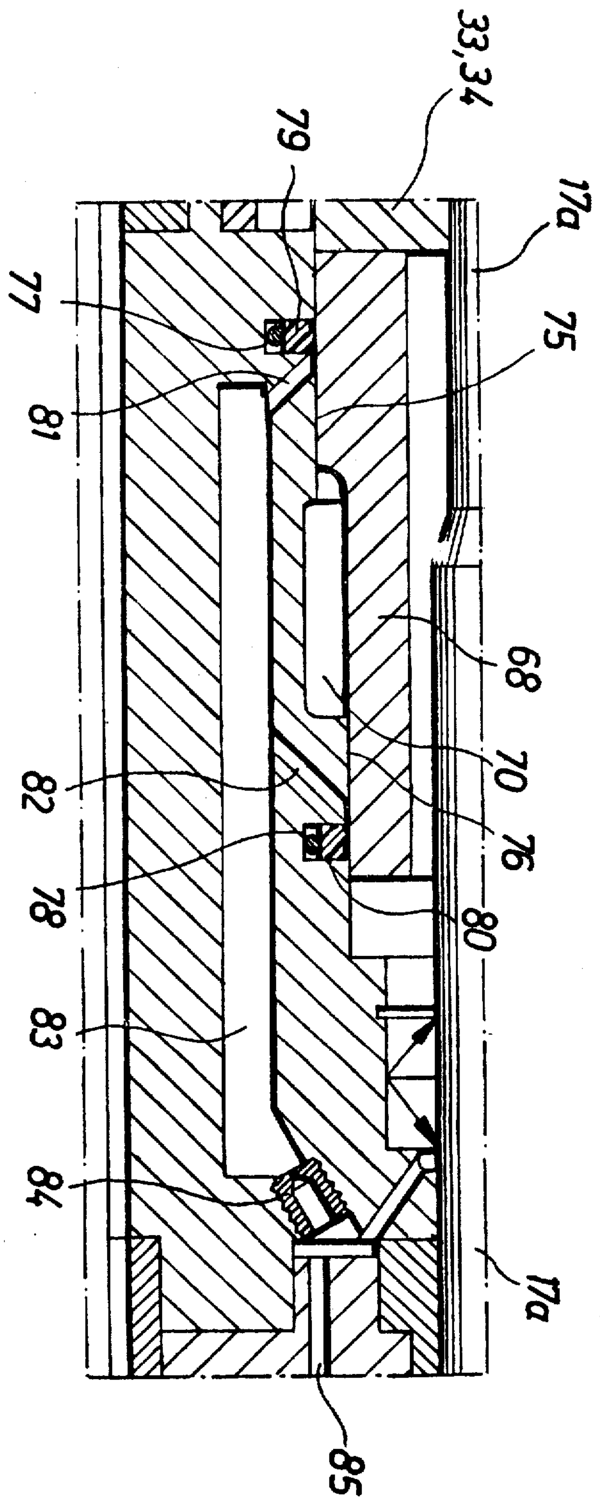
FIG. 4 shows a part of FIG. 1 on a larger scale.

It is certified that error appears in the above-identified patent and that said Letters Patent is hereby corrected as shown below:

IN THE DRAWINGS:

Add Figure 4, as per the attached.

Signed and Sealed this

*Ninth* Day of *July 1985*

[SEAL]

*Attest:*

DONALD J. QUIGG

*Attesting Officer* *Acting Commissioner of Patents and Trademarks*